(12) United States Patent
Picco et al.

(10) Patent No.: US 7,239,246 B2
(45) Date of Patent: Jul. 3, 2007

(54) SYSTEM AND METHOD FOR DETECTING WATER LEAKAGE

(75) Inventors: David Picco, Carlsbad, CA (US); Ibrahim Hanna Makhlouf, Fullerton, CA (US); Jeffery Ross Gray, San Diego, CA (US)

(73) Assignee: Touridan Corporation, Las Vegas, NV (US)

( * ) Notice: Subject to any disclaimer, the term of this patent is extended or adjusted under 35 U.S.C. 154(b) by 410 days.

(21) Appl. No.: 10/804,304

(22) Filed: Mar. 19, 2004

(65) Prior Publication Data

US 2005/0174246 A1    Aug. 11, 2005

Related U.S. Application Data

(60) Provisional application No. 60/540,518, filed on Jan. 29, 2004.

(51) Int. Cl.
```
G08B 21/00    (2006.01)
G01M 3/04     (2006.01)
B01L 9/02     (2006.01)
B01R 27/08    (2006.01)
```
(52) U.S. Cl. ............ 340/618; 340/603; 340/604; 340/605; 340/620; 73/40; 73/40.5 R; 73/725; 73/734; 324/691; 324/693; 324/694

(58) Field of Classification Search ........ 340/603–605, 340/618–620; 73/40, 40.5 R, 732, 725, 734; 324/691–694

See application file for complete search history.

(56) References Cited

U.S. PATENT DOCUMENTS

| | | | |
|---|---|---|---|
| 3,541,491 A | 11/1970 | Worster | 338/211 |
| 4,297,686 A | 10/1981 | Tom | 340/604 |
| 4,514,722 A * | 4/1985 | Batcheler et al. | 340/604 |
| 5,081,422 A * | 1/1992 | Shih | 324/693 |
| 5,546,009 A * | 8/1996 | Raphael | 324/694 |
| 6,192,752 B1 | 2/2001 | Blaine | 73/290 R |
| 6,208,254 B1 | 3/2001 | McQueen et al. | 340/603 |
| 6,490,920 B1 | 12/2002 | Netzer | 73/304 C |
| 6,526,807 B1 * | 3/2003 | Doumit et al. | 73/40.5 R |
| 6,995,676 B2 * | 2/2006 | Amacher | 340/602 |
| 7,049,969 B2 * | 5/2006 | Tamai | 340/573.5 |
| 7,084,776 B2 * | 8/2006 | Tacilauskas | 340/604 |

* cited by examiner

*Primary Examiner*—Daniel Wu
*Assistant Examiner*—Lam Pham
(74) *Attorney, Agent, or Firm*—Law Office of Gerald Maliszewski; Gerald Maliszewski

(57) ABSTRACT

A 3D liquid detection sensor, liquid-sensitive building material, and liquid detection systems have been provided. The 3D sensor comprises a 3D liquid detection field and an electrical connector to supply a resistance measurement responsive to liquid in the detection field. In one aspect, the 3D liquid detection field includes a first plurality of pins having a distal end electrically connected to a first electrical contact of the electrical connector, and a second plurality of pins having a distal end electrically connected to a second electrical contact. In one aspect, each pin includes a building material attachment barb attached to a pin proximal end. This permits the sensor to be fixedly mounted in drywall or ceiling tile, for example. More specifically, the 3D detection field may include a dielectric sheet (either rigid or flexible), and electrically conductive traces formed overlying the dielectric sheet, with pins extending from the traces.

24 Claims, 12 Drawing Sheets

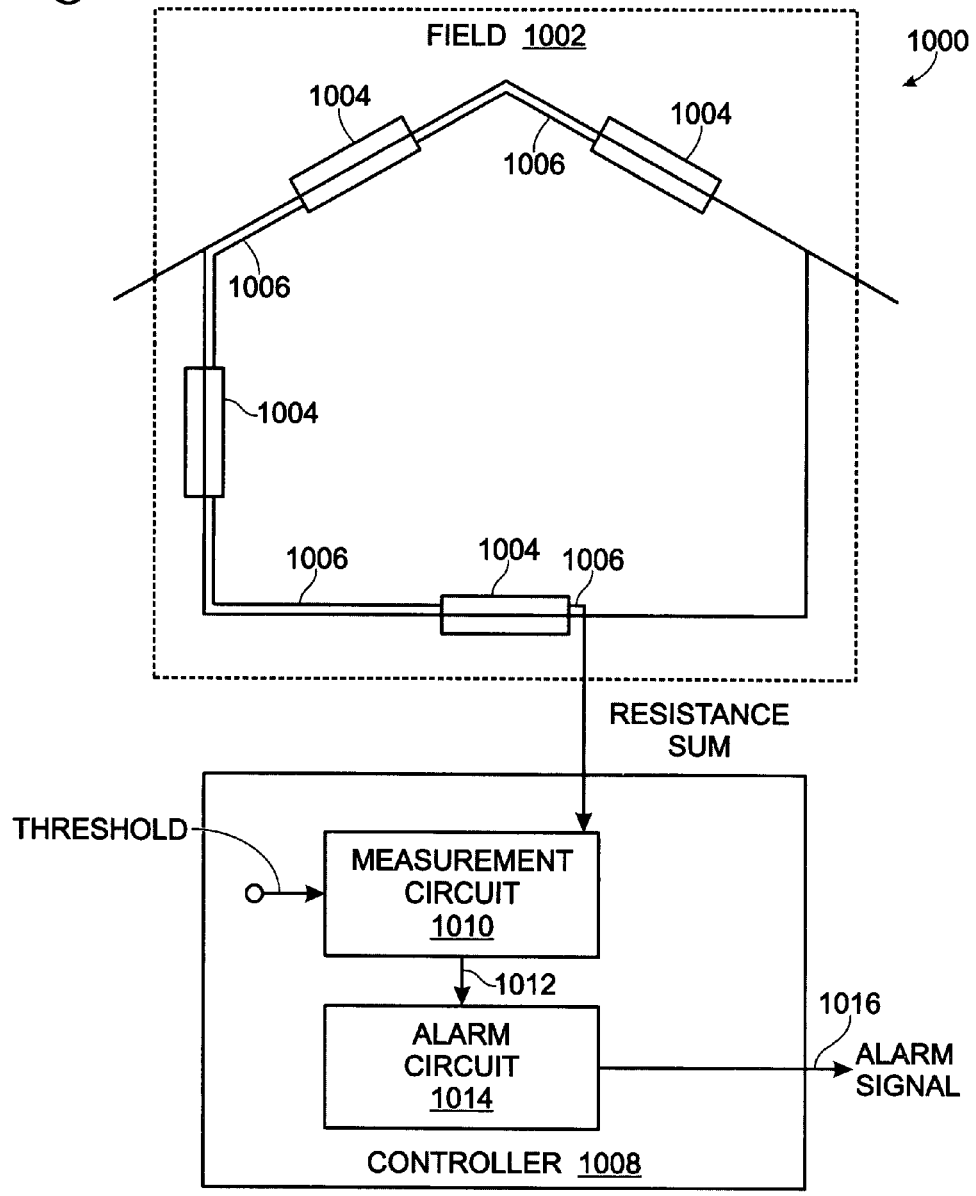

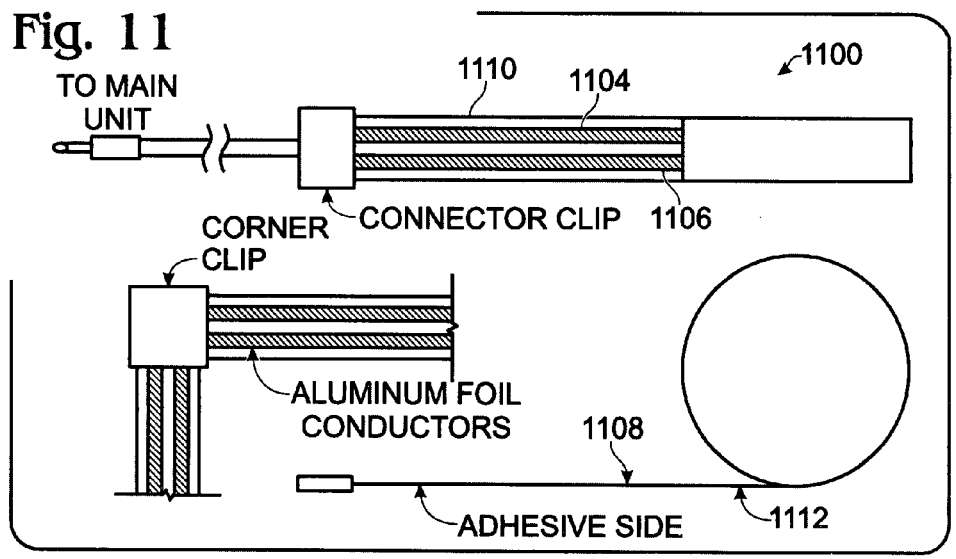
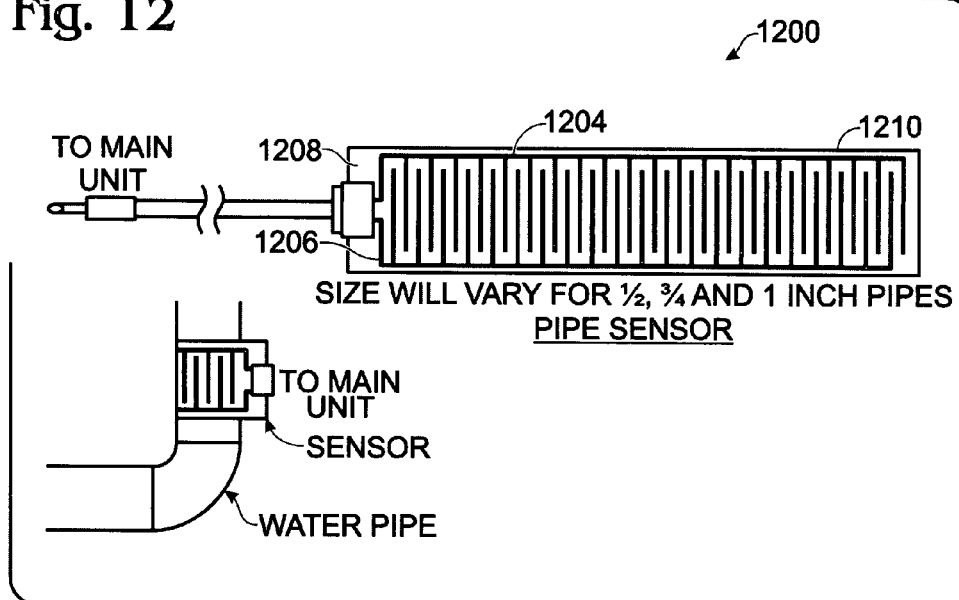

SYSTEM AND METHOD FOR DETECTING WATER LEAKAGE

RELATED APPLICATIONS

This application claims the benefit of a provisional patent application entitled, A RESISTIVE LIQUID DETECTOR SENSOR, invented by David Picco, Ser. No. 60/540,518, filed Jan. 29, 2004.

BACKGROUND OF THE INVENTION

1. Field of the Invention

This invention generally relates to emergency alarm sensors and, more particularly, to a system and method for detecting water leakage in a building structure.

2. Description of the Related Art

Plumbing failures in residential and commercial building result in millions of dollars of damage each year, in this country alone. As a result, systems have been designed to detect pools of water or leakage from a pipe. For example, conductive liquid sensors are known that consist of two electrically conductive materials formed on an insulating material in close proximity, but without touching. When liquid is sensed across the two conductive materials, the resistance between the conductive materials drops. This reduction in resistance is monitored, and a decrease in resistance can indicate the presence of liquid. This method provides an economical means to sense liquid on floor surfaces due to leaks in pipes, failed fittings, leaking valves, and floods.

One reference describes sensors that may be joined in "L" or "T" shaped combinations, see U.S. Pat. No. 4,297,686, invented by M. Dale Tom. The sensors may be connected in various configurations to provide a wider coverage area. The sensors are connected to a detection circuit that measures resistance. However, these sensors do not allow for the simple connection of different sensor types. Nor can these sensors to be connected together remotely, in multiple locations. That is, these sensors cannot be configured into centralized network that performs an overall water monitoring function for an entire building.

Further, these sensors are essentially two-dimensional. They can be located over a wall or a floor, for example. While these sensors may be sufficient to detect flooding and pools of water, they cannot necessarily detect water build-up in materials such as drywall or carpeting. As a result, an alarm may not be sounded until significant damage has been done.

It would be advantageous if a centralized system could be provided to monitor water in a plurality of locations throughout a building.

It would be advantageous if a water, or liquid detection sensor could be provided that was able to detect water in a building material such as drywall or carpeting.

It would be advantageous if liquid detection sensors could be integrally formed in building materials such as plywood, drywall, and insulation.

It would be advantageous if the above-mentioned integrally formed sensors could be networked to form a building-wide liquid detection system.

SUMMARY OF THE INVENTION

The present invention describes a number of advances in water detection systems. In one aspect, a three-dimensional (3D) sensor is disclosed for detecting water in a building material. In another aspect, a sensor integrally formed in a building material such as drywall or plywood is described. In a different aspect, a system for networking a plurality of different types of water detection sensors is disclosed. For example, independently powered sensors are described that may interface with a monitoring controller via a radio frequency or ac powerline signal interface.

The 3D liquid detection sensor is summarized below. Accordingly, the 3D liquid detection sensor comprises a 3D liquid detection field and at least one electrical connector to supply a resistance measurement responsive to liquid in the detection field. In one aspect, the 3D liquid detection field includes a first plurality of pins having a distal end electrically connected to a first electrical contact of the electrical connector, and a second plurality of pins having a distal end electrically connected to a second electrical contact. In one aspect, each pin includes a building material attachment barb attached to a pin proximal end. This permits the sensor to be fixedly mounted in drywall or ceiling tile, for example.

More specifically, the 3D detection field may include a dielectric sheet (either rigid or flexible), and a first electrically conductive trace formed overlying the dielectric sheet, connected to the first electrical contact. The first plurality of pins extends from the first trace. Likewise, a second electrically conductive trace is formed overlying the dielectric sheet and connected to the second electrical contact. The second plurality of pins extends from the second trace. In one aspect, the pins are selectively detachable, at the distal end, from the electrically conductive traces.

Additional details of the 3D sensor summarized above, a building material integral sensor, and liquid detection systems are described below.

BRIEF DESCRIPTION OF THE DRAWINGS

FIG. 10 is a schematic block diagram of the present invention system for detecting water leakage in a building.

FIG. 11 is a drawing depicting a two-dimensional (2D) tape liquid detection sensor.

FIG. 12 is a drawing depicting a 2D pipe liquid detection sensor.

DETAILED DESCRIPTION OF THE PREFERRED EMBODIMENTS

Figure 1:
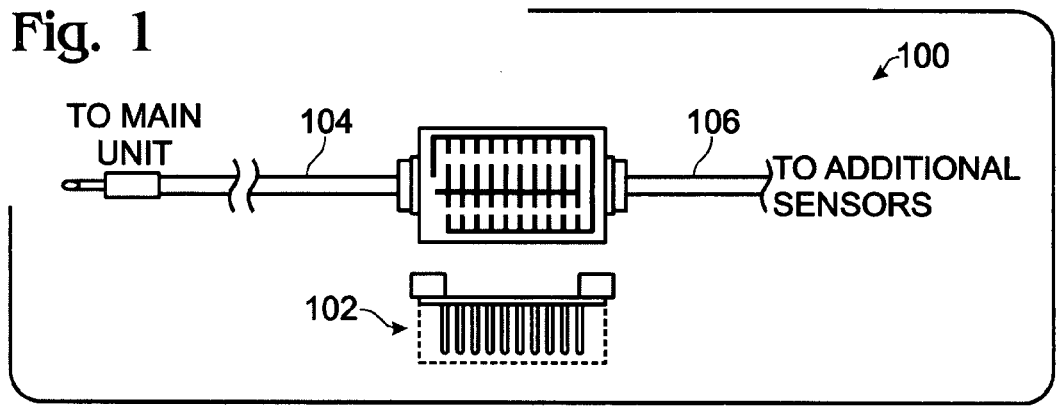
FIG. 1 is a plan and partial cross-sectional view of the present invention three-dimensional liquid detection sensor.

FIG. 1 is a plan and partial cross-sectional view of the present invention three-dimensional liquid detection sensor. The 3D liquid detection sensor 100 comprises a 3D liquid detection field 102 (surrounded by dotted lines) and a first electrical connector 104 to supply a resistance measurement responsive to liquid in the detection field 102. In one aspect, as shown, the sensor 100 includes a second electrical connector 106. As shown, the first electrical connector 104 is shaped to electrically connect and physically engage a first mating connector (not shown) with a pair of electrical contacts. The connector can be similar to pronged speaker connector for example. The present invention is not limited to any particular type of connection, as there are many small, rugged, and inexpensive connectors known in the art.

Figure 2:
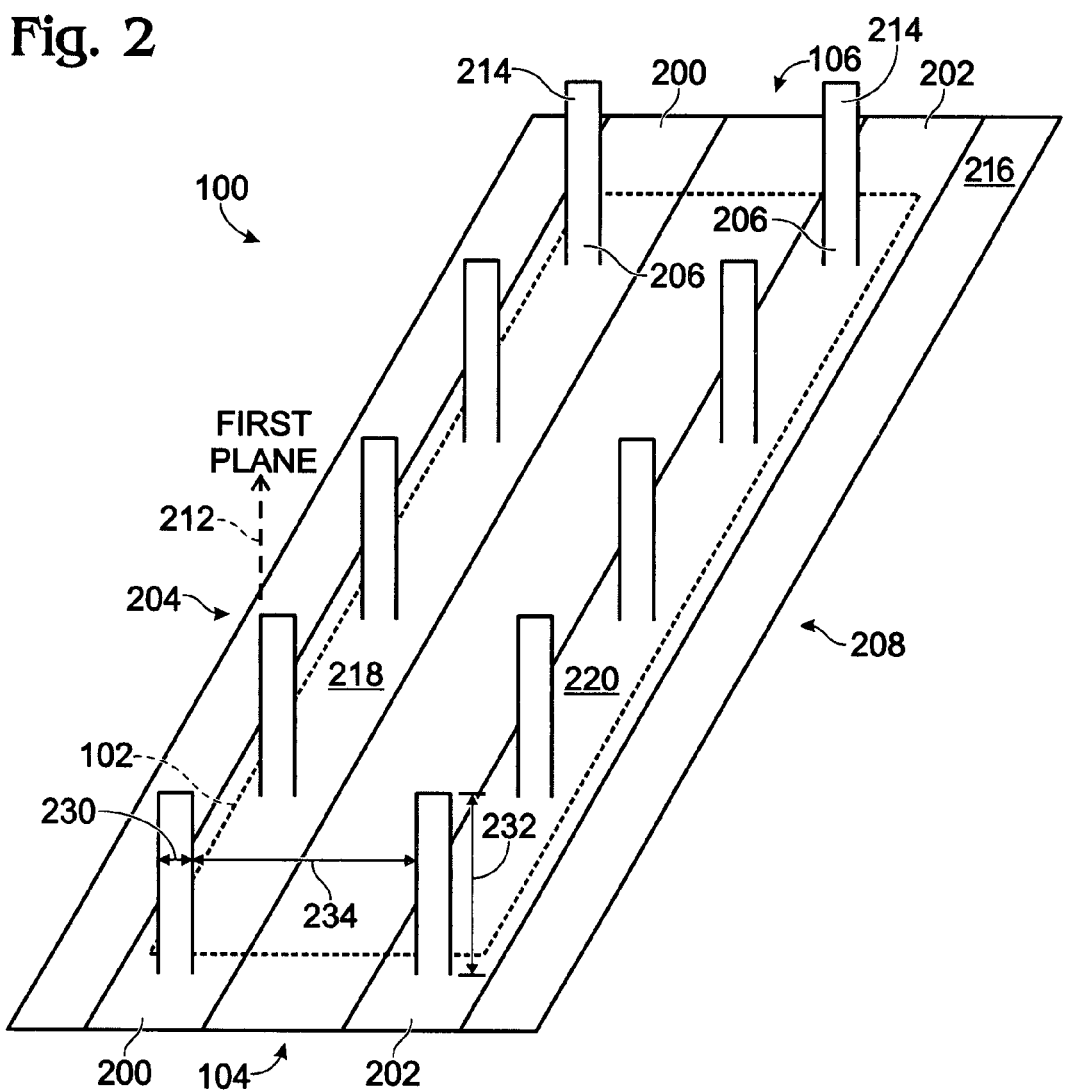
FIG. 2 is a perspective, more detailed view of the sensor of FIG. 1.

FIG. 2 is a perspective, more detailed view of the sensor 100 of FIG. 1. Both the first and second electrical connectors 104/106 include a pair of electrical contacts 200/202. In one aspect, the 3D liquid detection field 102 includes a first plurality of pins 204 having a distal end 206 electrically connected to the first electrical contact 200. Likewise, a second plurality of pins 208, each having a distal end 206, is electrically connected to the second electrical contact 202. In one aspect, each pin 204/208 has an axis aligned in a first plane 212. The pins 204/208 also have a proximal end 214. The pins 204/208 may be formed from a conventional copper alloy or steel material, for example. Corrosion-resistant materials are preferred. However, the invention is not limited to any particular material. For example, it is known that common "tap water" has a mineral content high enough to make water electrically conductive. Therefore, tap water in the detection field 102 typically decreases the electrical resistance, or increases the conductivity, between contacts 200 and 200.

The detection field 102 (in dotted lines) may additionally include a dielectric sheet 216. The dielectric sheet 216 may be rigid, or made of a flexible material, so that it can be wrapped or folded. For example, the dielectric 216 may be rigid plastic, such as a convention printed circuit board (PCB) material, a soft plastic, or even a paper-like material. The present invention is not limited to any particular type of dielectric material. A first electrically conductive trace 218 is formed overlying the dielectric sheet 216 and connected to the first electrical contact 200. A second electrically conductive trace 220 is formed overlying the dielectric sheet 216 and connected to the second electrical contact 202. The first plurality of pins 204 extend from the first trace 218 and the second plurality of pins 208 extend from the second trace 220.

The traces 218 and 220 are shown as essentially straight lines, but the traces 218/220 may be formed in other patterns in different aspects of the invention. For example, the traces 218/220 may form a serpentine pattern across the dielectric 216. In FIG. 1, another pattern is shown, where one of the traces is forked to "surround" the other trace. As shown, the pins 204/208 have an approximately uniform density in populating the traces 218/220. However, the pins 204/208 densities may be varied in other aspects of the invention.

Figure 3:
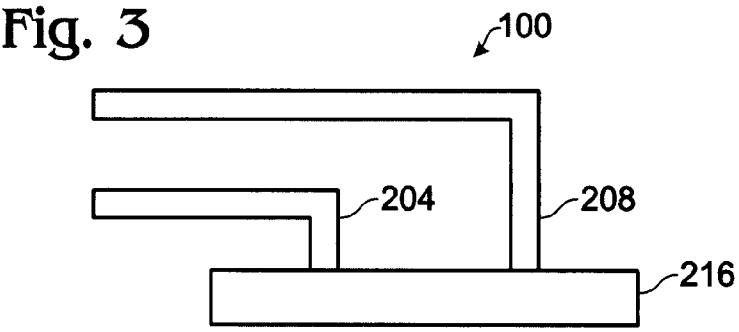
FIG. 3 is a partial cross-sectional view of a first variation of the 3D sensor of FIG. 1.

FIG. 3 is a partial cross-sectional view of a first variation of the 3D sensor of FIG. 1. In this aspect, each pin 204/208 has a right-angle shape. This shape permits the sensor to be mounted in a greater variety of positions than the straight-pin aspect.

Figure 4:
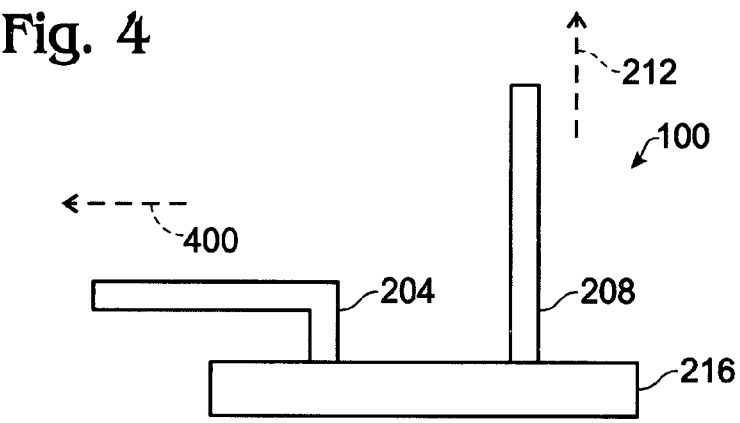
FIG. 4 is a partial cross-sectional view of a second variation of the 3D sensor of FIG. 1.

FIG. 4 is a partial cross-sectional view of a second variation of the 3D sensor of FIG. 1. In this aspect, the first plurality of pins 204 each have an axis aligned in a first plane 212. The second plurality of pins 208 each have an axis aligned in a second plane 400, different from the first plane. As shown, the first and second planes are orthogonal, for mounting in a corner position for example, but they may have alternate relationships in other aspects. In a different aspect not shown, the traces are formed on opposite sides of the dielectric 216.

Figure 5:
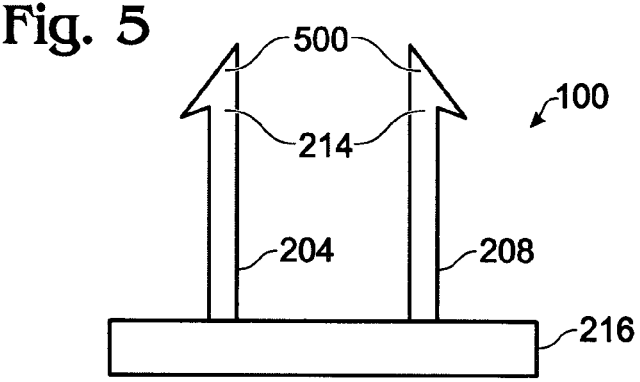
FIG. 5 is a partial cross-sectional view of a third variation of the 3D sensor of FIG. 1.

FIG. 5 is a partial cross-sectional view of a third variation of the 3D sensor of FIG. 1. In this aspect, some of the pins 204/208 have a building material attachment barb 500 attached to a pin proximal end 214. In other aspects, each pin has a barb 500. The barb 500 can be used secure attach the sensor 100 to a material such as drywall or a ceiling tile. In other aspect, a nonconductive barbed pin or pins (not shown) may be fastened directly to the dielectric 216. In this aspect, the fastening (barbed) pins are not the same pins 204/208 that form the 3D liquid detection field.

Returning to FIG. 2, in some aspects, each pin 204/208 has a cross-sectional axis diameter 230 in the range of 0.01 to 0.3 inches. Note that the pins need not necessarily all have the same diameter 230. Each pin 204/208 has a length 232 in the range of 0.25 to 5 inches. Again, the pins need not necessarily all have the same length 232. The separation 234 between pins from the first plurality of pins 204 and adjacent pins from the second plurality of pins 208 is in the range of 0.1 to 2 inches.

For example, if the detection field 102 is a drywall interface, the optimal length 232 of the pins 204/208 may vary in the range of 0.375 to 0.5 inches. If the detection field 102 is an insulation interface, the optimal length 232 of the pins may vary in the range of 1.5 to 5 inches. If the detection field 102 is a carpet interface, the optimal length 232 of the pins may vary in the range of 0.25 to 0.375 inches.

The separation 234, pattern, diameter 230, length 232, and density of the pins 204/208 are used in the control of the sensor sensitivity to moisture. Different pre-moisture resistivities may be desirable for different media. For example, drywall is capable of holding more water than insulation. Therefore, a drywall sensor may be fabricated with a greater (pre-moisture) resistivity, or less moisture susceptibility between traces. As will be appreciated by one skilled in the art, a voltage differential is applied to the sensor traces. As the resistivity between the traces decreases, in response to water in the detection field 102 for example, the voltage differential decreases. In this manner, resistivity is measured.

Figure 6:
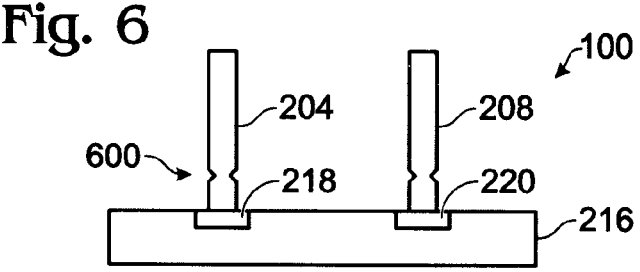
FIG. 6 is a partial cross-sectional view of a fourth variation of the 3D sensor of FIG. 1.

FIG. 6 is a partial cross-sectional view of a fourth variation of the 3D sensor of FIG. 1. In this aspect, the pins 204/208 are selectively detachable, at the distal end 206, from the electrically conductive traces 218/220. As shown, the pins 204/208 are detached at a narrow "neck" portion 600 of the pin. However, other means can be used to make the pins easily detachable. For example, the pins 204/208 may be inserted through the conductive traces and selectively removable. This aspect of the invention permits a user to modify the resistivity between traces 218/220, so that the same type of sensor may be used for monitoring two different types of materials. For example, an unmodified sensor may be used to monitor insulation, and pins may be detached from the sensor, so that it can be used as a carpet monitor.

Figure 7:
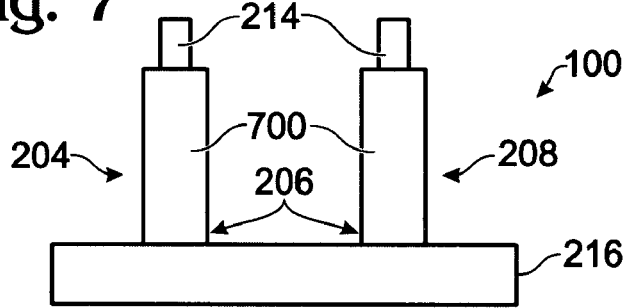
FIG. 7 is a partial cross-sectional view of a fifth variation of the 3D sensor of FIG. 1.

FIG. 7 is a partial cross-sectional view of a fifth variation of the 3D sensor of FIG. 1. As shown, the pins 204/208 each include an electrically insulated shoulder 700 covering the distal end 206 and an electrically conductive proximal end 214. Note, not every pin need necessarily include an insulated shoulder. Such an arrangement permits the sensor 100 to be inserted through a first medium, insulation for example, to monitor as adjacent medium, drywall for example.

Figure 8:
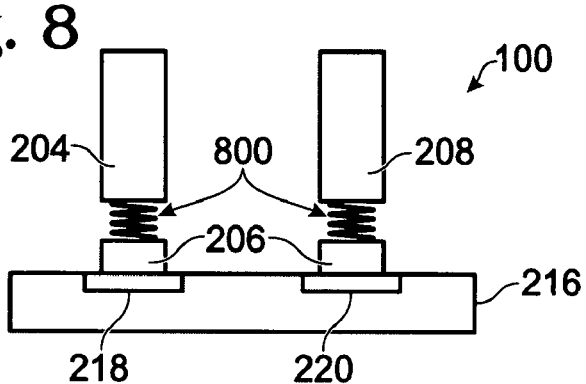
FIG. 8 is a partial cross-sectional view of a sixth variation of the 3D sensor of FIG. 1.

FIG. 8 is a partial cross-sectional view of a sixth variation of the 3D sensor of FIG. 1. In this aspect, the pins 204/208 include a compressible spring connection 800 between the distal end 206 of the pin, and the electrical trace 218/220 from which the pin extends. Note, not every pin need necessarily include the spring connection. The springs help maintain a constant tension been the sensor and an interfacing surface. Alternately but not shown, the pin distal end may be formed in an "S" shape to provide a spring-like tension when the pin is inserted into a material.

Figure 9:
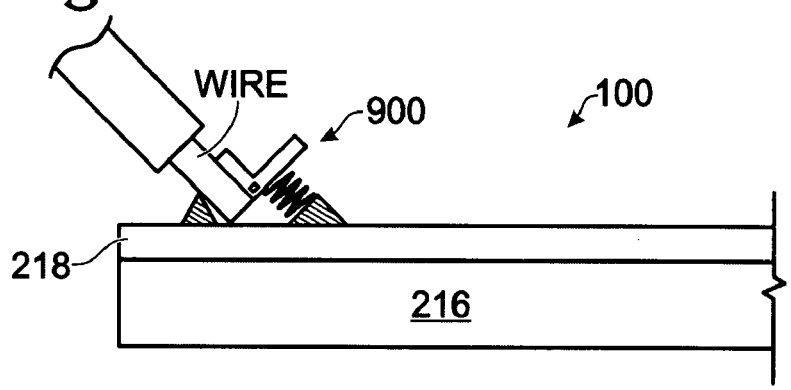
FIG. 9 is a partial cross-sectional view of a seventh variation of the 3D sensor of FIG. 1.

FIG. 9 is a partial cross-sectional view of a seventh variation of the 3D sensor of FIG. 1. The first electrical connector 104 uses spring-loaded jaws 900 to capture a wire. These jaws 900 are similar to the thumb-depressible clamps used on audio speakers to electrically and mechanically engage a speaker wire. Such a jaw 900 permits the sensor to be connected using simple wire. In other aspects, the jaw tension is created through the use of a spring clip. Other means of tensioning a jaw or connector are known in the connector art.

Figure 17:
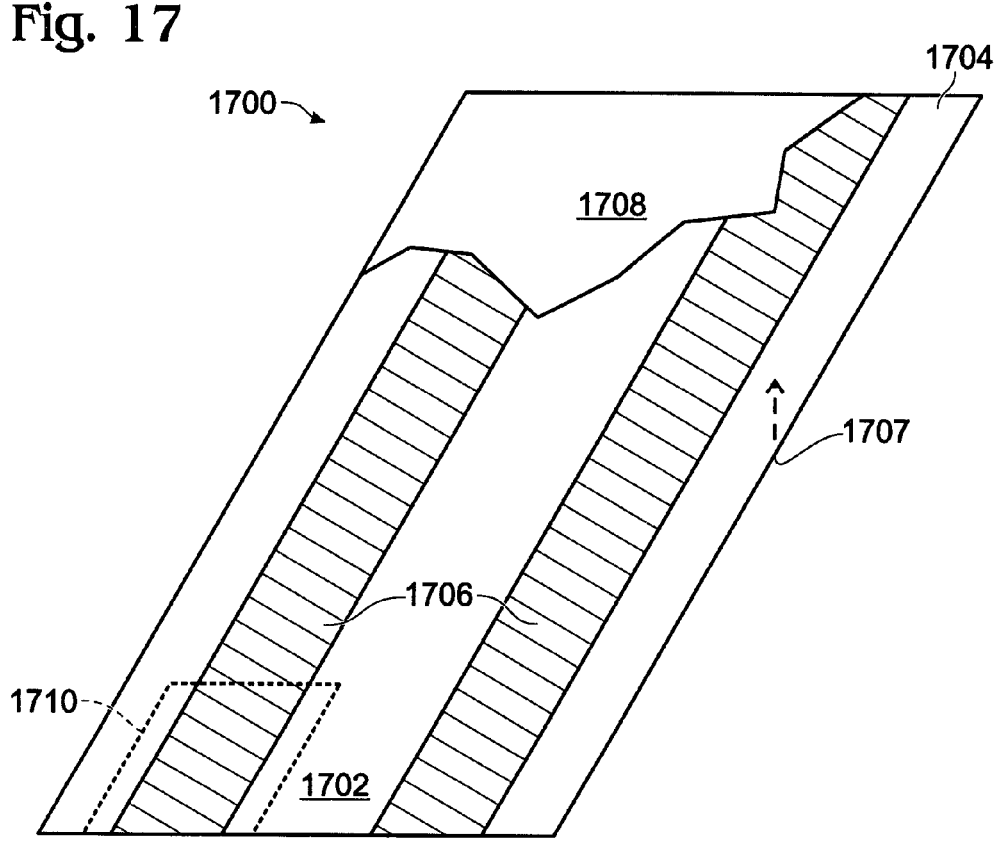
FIG. 17 is a perspective diagram illustrating the present invention liquid-sensitive building material.

FIG. 17 is a perspective diagram illustrating the present invention liquid-sensitive building material. The liquid-sensitive building material 1700 comprises a building material 1702, such as plywood, tar paper, insulation, pipes (not shown), or ceiling tile with a surface 1704. These materials are used as examples, but the invention is not limited to just these example materials. A liquid detection sensor 1706, formed from a conductor (shown as cross-hatched), overlies the building material surface 1704. Alternately but not shown, the liquid detection sensor 1706 includes a pair of conductors on opposite sides of the building material, having an electrical resistance that is responsive to liquid between the conductors. That is, one conductor is formed on surface 1704, and one conductor is formed on surface 1707.

In one aspect, the liquid-sensitive building material further includes a sheet of material 1708 overlying the liquid detection sensor 1706 on the building material surface. The sheet 1708 is used to protect the sensor 1706 during handling. In other aspects, the sheet 1708 is porous and used to hold water, to increase the sensitivity of the liquid-sensitive building material 1700. In a different aspect, the liquid-sensitive building material further comprises a detachable protecting coating 1710 (shown with dotted lines) overlying the sensor 1706 on the building material surface. The coating protects the sensor 1706 during handling and constructive, and can be removed, or partially removed after construction is completed.

In one aspect, the liquid detection sensor 1706 is a pair (or pattern) of conductive ink traces on the building material surface 1704 having an electrical resistance that is responsive to liquid between the traces. It is known to use conductive ink in the fabrication of electric circuitry on t-shirts, toys, and disposable electronics. These inks permit low-cost offset printing processes to be used in large-scale manufacturing. Such inks are manufactured by T-Ink, Seiko Epson, and E Ink, to name a few manufactures.

Figure 18:
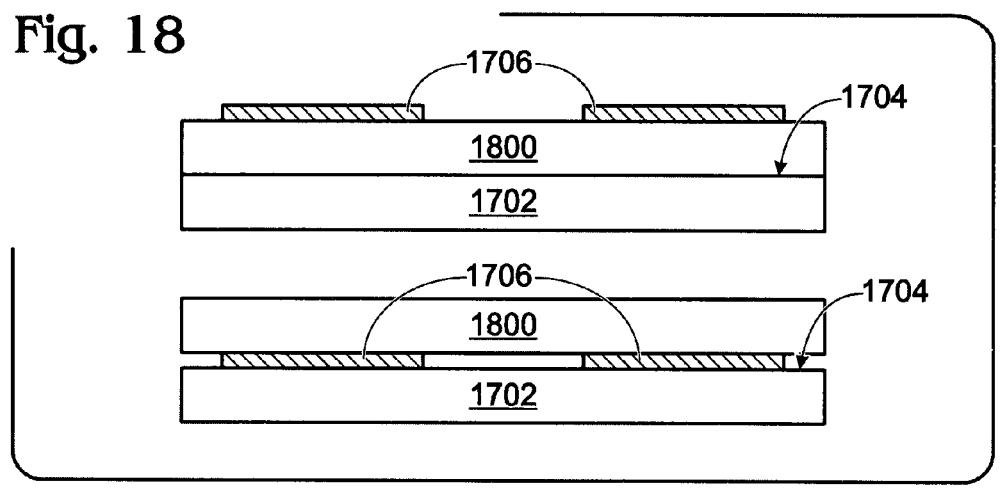
FIG. 18 is a partial cross-section view of an alternate aspect of the liquid-sensitive building material of FIG. 17.

FIG. 18 is a partial cross-section view of an alternate aspect of the liquid-sensitive building material of FIG. 17. This aspect further comprises an adhesive sheet 1800 attached to the building material surface 1704. The liquid detection sensor 1706 is formed on the adhesive sheet 1800. The sensor 1706 is integrally formed on the adhesive sheet 1800, and permits a building material to become "liquid-sensitive" after it is installed for example. Further, the sheet 1800 can be used to replace the integrally formed sensor 1706, if the sensor 1706 is damaged during shipment or construction.

Figure 20:
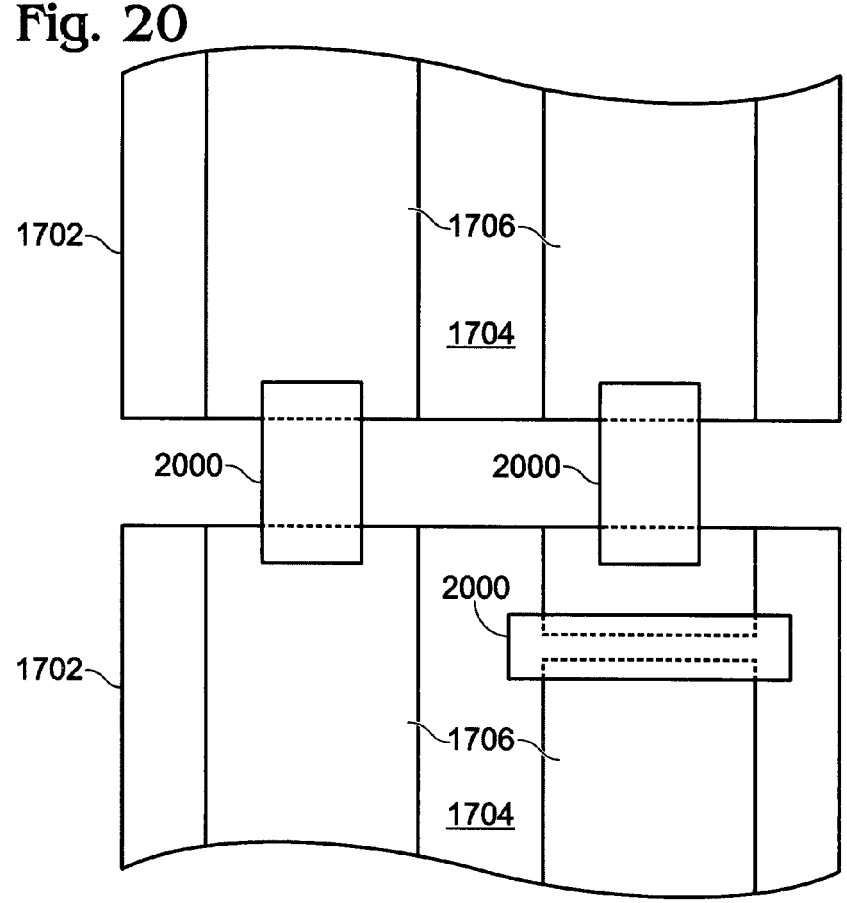
FIG. 20 is a diagram illustrating a pair of adjoining liquid-sensitive building materials.

FIG. 20 is a diagram illustrating a pair of adjoining liquid-sensitive building materials. In some aspects, the building material 1700 further comprises an electrically conductive adhesive connector 2000. The connector 2000 can be used for bridging discontinuities in the sensor conductor on the building material surface 1704. For example, the connector 2000 can be a copper foil with conductive adhesive, such as the 1181 tape manufactured by 3M. Also as shown, the adhesive connector may be used to bridge between sensor conductors on adjoining building material surfaces 1704. In another aspect, the connectors can be used to hold metal wires in place.

Figure 21:
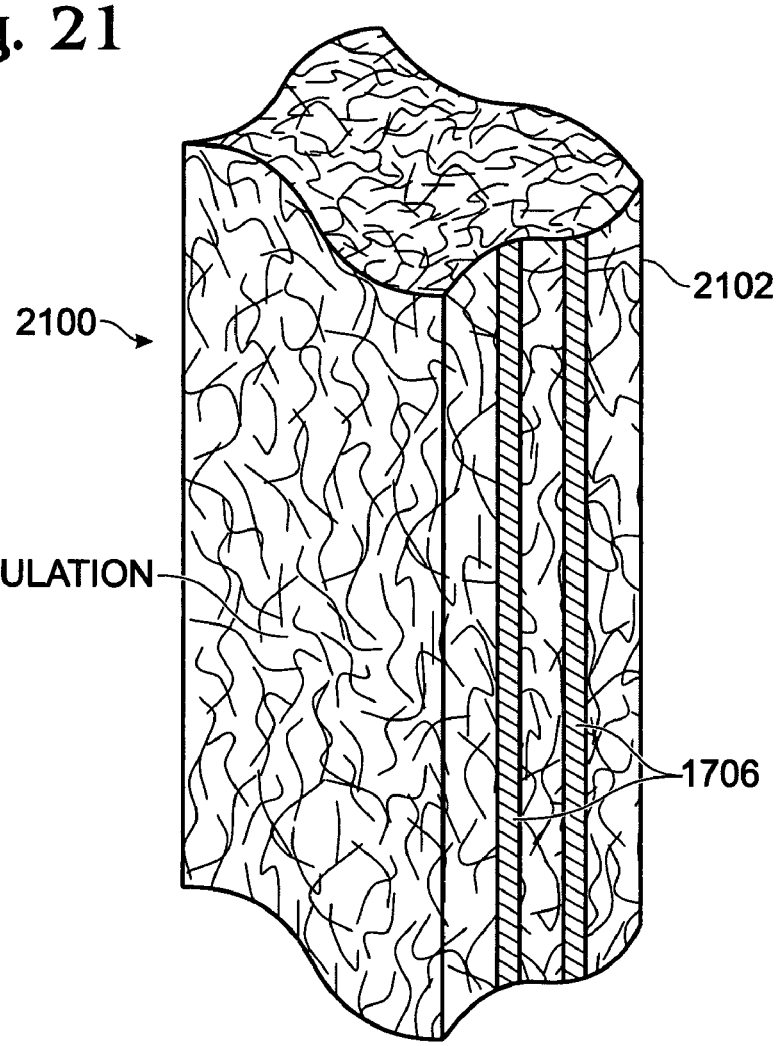
FIG. 21 is a diagram illustrating a liquid-sensitive insulation building material.

FIG. 21 is a diagram illustrating a liquid-sensitive insulation building material. Typically, insulation 2100 is backed with a sheet 2102 of foil, foil/asphalt, or vapor (plastic) retardant sheets. The liquid detection sensor 1706 is formed overlying the insulation backing sheet 2102. Although shown on the outside sheet surface, the sensor may also be formed on the backing sheet 2102 inside surface (facing the insulation).

Figure 22:
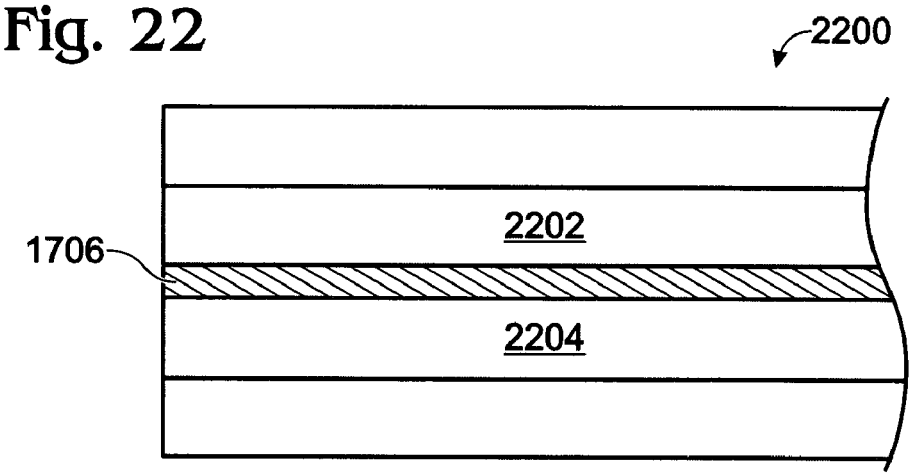
FIG. 22 is a diagram illustrating a liquid-sensitive plywood building material.

FIG. 22 is a diagram illustrating a liquid-sensitive plywood building material. The plywood sheet 2200 has a plurality of overlying bonded wood layers, including layers 2202 and 2204. In this aspect, the liquid detection sensor 1706 is formed interposed between bonded layers 2202/2204 of the plywood sheet.

Figure 23:
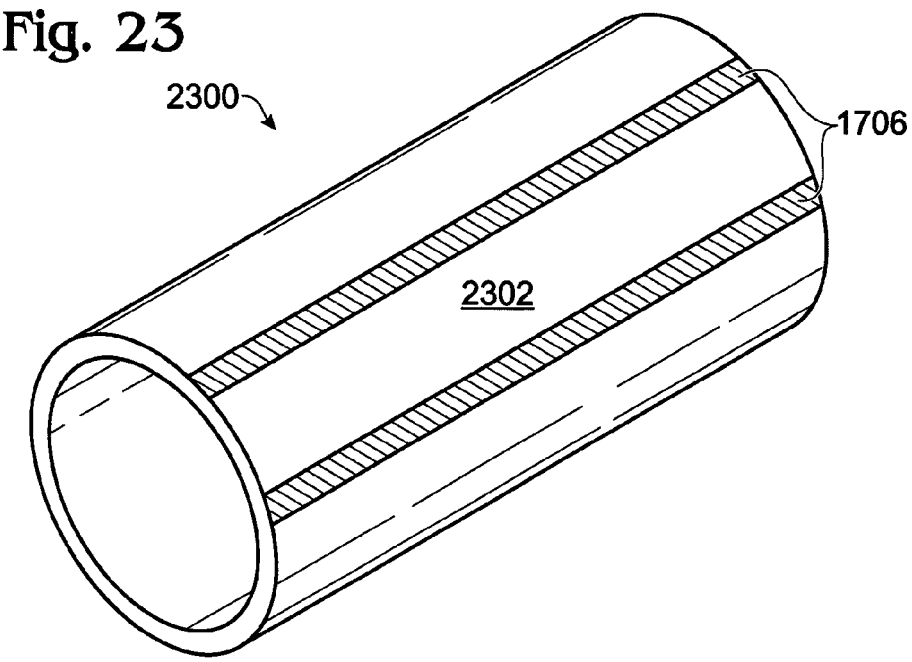
FIG. 23 is a diagram illustrating a liquid-sensitive pipe building material.

FIG. 23 is a diagram illustrating a liquid-sensitive pipe building material. The pipe building material 2300 has an exterior surface 2302. The liquid detection sensor 1706 is formed overlying the pipe exterior surface 2302. Note, although the conductive traces of sensor 1706 are shown formed parallel to the axis of the pipe, in other aspects (not shown), the sensor is formed wrapped around the pipe axis, or wrapped around the pipe in a spiral pattern.

FIG. 10 is a schematic block diagram of the present invention system for detecting water leakage in a building. The system 1000 comprises a liquid detection field 1002 including a plurality of liquid detection sensors 1004 and cables 1006. The sensors 1004 supply an electrical resistance measurement responsive to detected moisture. The cables 1006 series-connect the plurality of sensors 1004 and supply a resistance sum, where the resistance sum is the overall resistance of the series-connected sensors 1004. A controller 1008 includes a measurement circuit 1010 connected to the liquid detection field 1002 to accept the resistance sum. The measurement circuit 1010 compares the resistance sum (voltage) to a threshold resistance (voltage) and supplies a control signal on line 1012 in response to the comparison. An alarm circuit 1014 has an input on line 1012 to accept the control signal and an output on line 1016 to supply an alarm signal. For example, the alarm signal may be an audio signal, a visual signal, a hard-wired telephone signal, a cell telephone signal, or a wireless signal. These signals may be used to warn a user of water leakage, or to shut off the water main for example. Note, more than one series-connected string of sensors (not shown) may be connected to the controller.

FIG. 11 is a drawing depicting a two-dimensional (2D) tape liquid detection sensor. This 2D flexible sensor 1100 includes a liquid detection interface 1102 with a pair of conductive traces 1104 and 1106 overlying a first face 1108 of a flexible dielectric sheet 1110. An adhesive (not shown) is attached to a second face 1112 of the flexible dielectric sheet 1110.

FIG. 12 is a drawing depicting a 2D pipe liquid detection sensor. This 2D flexible sensor 1200 includes a liquid detection interface 1202 with a pair of conductive traces 1204 and 1206 overlying a first face 1208 of a flexible dielectric sheet 1210 for mounting around an object such as a pipe or a hose.

Figure 13:
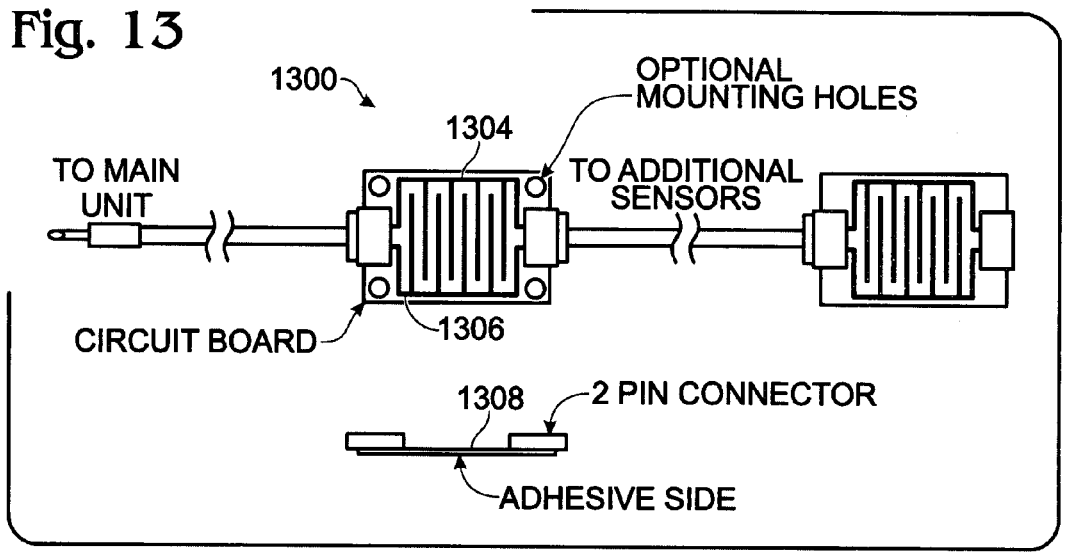
FIG. 13 is a drawing depicting a rigid 2D liquid detection sensor.

FIG. 13 is a drawing depicting a rigid 2D liquid detection sensor. This 2D rigid sensor 1300 includes a liquid detection interface 1302 with a pair of conductive traces 1304 and 1306 overlying a rigid dielectric sheet 1308 for mounting on a building surface such as a hardwood floor, a tile floor, concrete floor, or a baseboard.

Returning to FIG. 10, the liquid detection sensors 1004 used in the system 1000 may be a 3D sensor, as in FIG. 1, 2D flexible sensor, as in FIGS. 11 and 12, a liquid-sensitive building materials, as in FIG. 17, and/or a 2D rigid sensor, as seen in FIG. 13. As noted above, the pins of 3D sensor can be used for mounting in a building material such as carpet, padding, drywall, or ceiling tile. In one aspect, each cable 1006 is a wire-pair and the liquid detection sensors 1004 each include spring-loaded jaw electrical connectors (see FIG. 9) to capture the cable wires. However, other types of connectors may be used to mate the sensors 1004 to the cables (see FIG. 1, for example).

Figure 14:
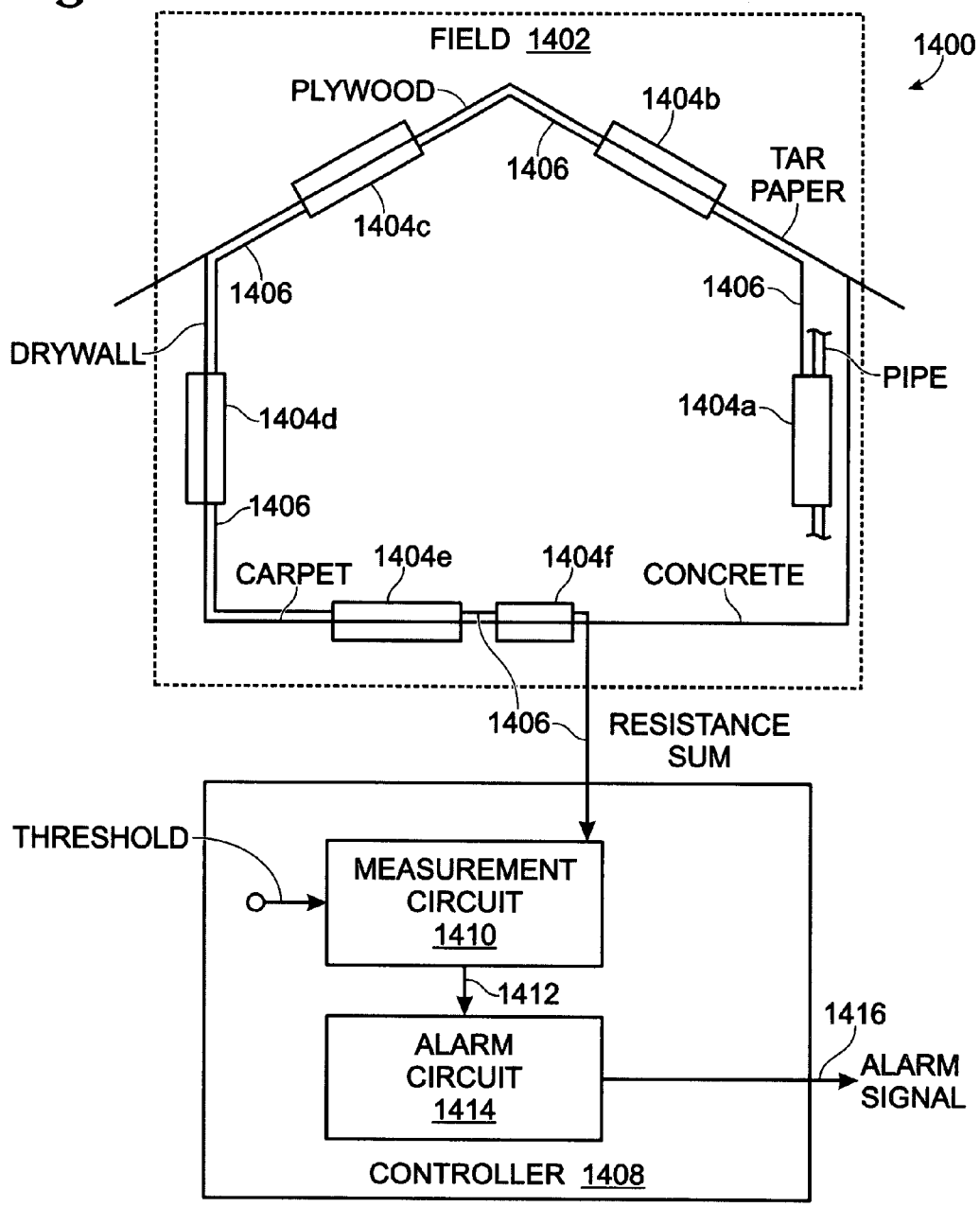
FIG. 14 is a schematic block diagram illustrating the present invention system for detecting water leakage in a building.

FIG. 14 is a schematic block diagram illustrating the present invention system for detecting water leakage in a building. The system 1400 comprises a liquid detection field 1402 including a plurality of connected liquid detection sensors 1404 and a plurality of cables 1406. More specifically, the plurality of sensors 1404 includes a first sensor type 1404a and at least a second sensor type 1404b, different than the first sensor type 1404a. Sensors 1404a through 1404f are shown. Note, although the sensors 1404 are shown connected in one series-connected string, in other aspects of the system 1400, a plurality of series-connected sensor strings are created. For example (not shown), sensors 1404a through 1404c are connected in one string, and sensors 1404d through 1404f are connected in a second string.

Each sensor 1404 supplies an electrical resistance measurement responsive to detected moisture. The cables 1406 connect the plurality of sensors 1404a/1404b and supply a resistance sum. A controller 1408 includes a measurement circuit 1410 connected to the liquid detection field 1402 to accept the resistance sum. The measurement circuit 1410 compares the resistance sum to a threshold resistance and supplies a control signal on line 1412 in response to the comparison. An alarm circuit 1414 has an input on line 1412 to accept the control signal and an output on line 1416 to supply an alarm signal. The liquid detection sensors 1404 may be a 3D, 2D flexible, liquid-sensitive building material, or a 2D rigid sensor.

Figure 15:
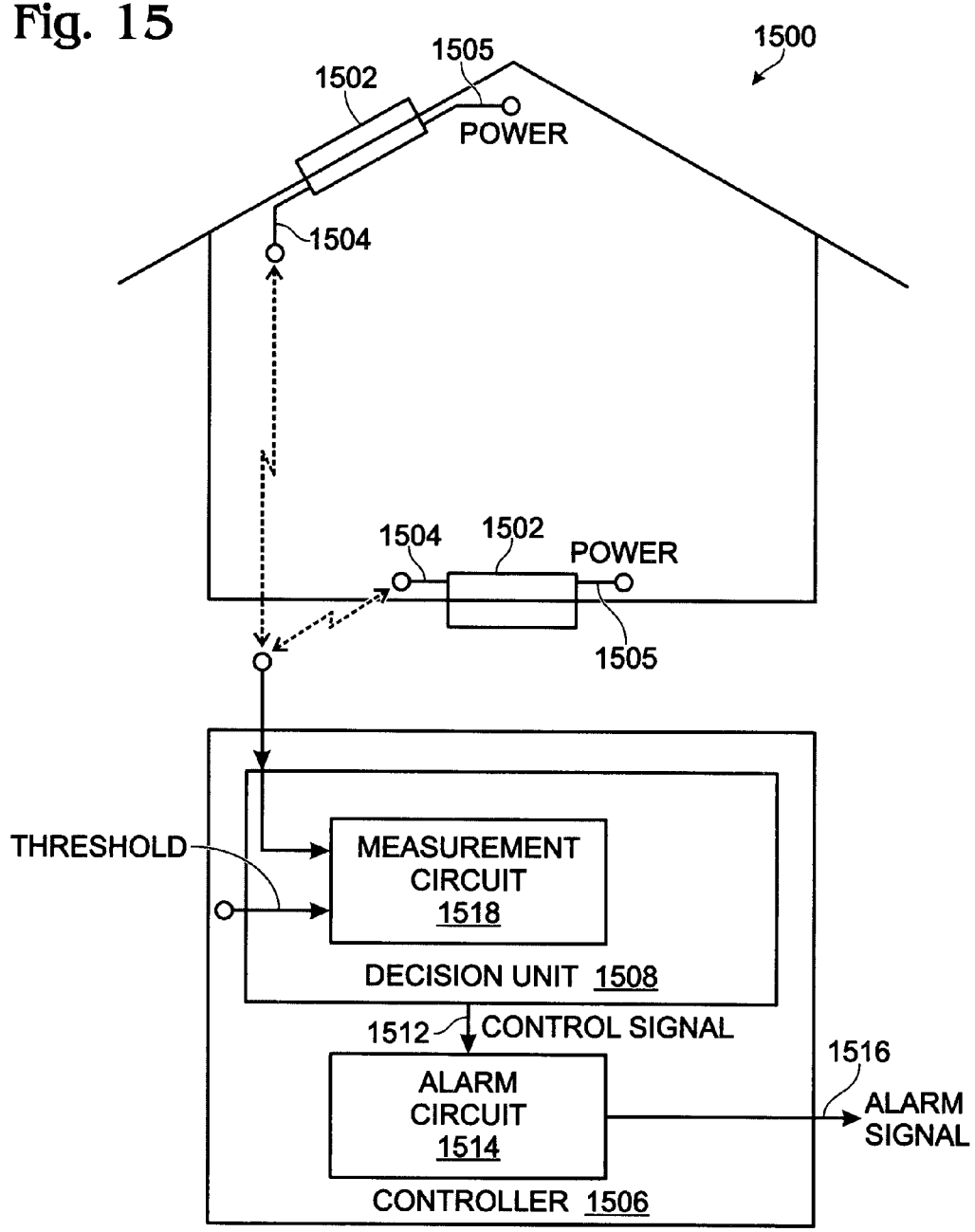
FIG. 15 is a schematic block diagram illustrating another aspect of the present invention system for detecting water leakage in a building.

FIG. 15 is a schematic block diagram illustrating another aspect of the present invention system for detecting water leakage in a building. The system 1500 comprises a plurality of independently powered liquid detection sensors 1502 with a controller interface 1504. For example, the sensor controller interface 1504 may be an ac power line-coupled transmitter or a radio frequency (RF) transmitter. The independently powered liquid detection sensors 1502 each have a power interface 1505 selected from the group including ac, dc, solar, and dc battery backup power. As in the above-mentioned systems, the liquid detection sensors may be 3D, 2D flexible, liquid-sensitive building material, or 2D rigid sensors.

Each sensor 1502 measures an electrical resistance responsive to detected moisture. A controller 1506 includes a decision unit 1508 having a sensor interface 1510 to accept communications from the sensors 1502 and an output on line 1512 to supply a control signal. An alarm circuit 1514 has an input on line 1512 to accept the control signal and an output on line 1516 to supply an alarm signal. As mentioned above, the alarm signal may be used to trigger a number of different responses.

In one aspect of the system, the sensors 1502 communicate resistance measurements via the controller interface 1504. The controller decision unit 1508 includes a measurement circuit 1518 to accept resistance measurements from the sensors 1502. The measurement circuit 1518 compares the resistance measurements to a threshold resistance and supplies the control signal in response to the comparison. For example, the measurement circuit 1518 sums the resistance measurements and compares the resistance sum to a threshold.

In a different aspect, each sensor 1502 compares the measured resistance to a threshold, and sends a detection message via the controller interface 1504 in response to the comparison. The controller decision unit 1508 accepts detection messages and supplies the control signal on line 1512 in response to receiving detection signals.

In another aspect of the system 1500, "slave" sensors (not shown) may be connected to one of the independently powered sensors 1502. In this arrangement, sensor 1502 acts as a "master" sensor that monitors and reports the resistance condition of any attached slave sensors.

FUNCTIONAL DESCRIPTION

Conventionally, liquid detection sensors have functioned in only two dimensions. Conductive materials have been applied on an insulating material. Such a sensor can be mounted flat on a surface, and is able to detect liquid on the surface. One novelty of the present invention is in the use of a resistive liquid detection sensor that provides three-dimensional liquid detection. The sensor has pins extending from the surface of the sensor in one or more directions. The pins may be pressed into, or through the surface of a material in order to provide liquid detection on the inside of the material, or on the opposite side of the material. The pins may be spring-loaded in order to maintain constant contact with a surface on the opposite side of the material, in order to provide optimum detection of liquid. The pins may be provided with shoulders made of insulating material, in order to provide sensing only in particular locations away from the surface of the sensor.

The resistive liquid detection sensor can be made of a flexible material, so it can be wrapped around the surface of a pipe or hose. If a leak is present in the pipe or hose, liquid travels over the sensor and the presence of liquid is detected.

Another point of novelty is in the use of resistive liquid detection sensor connectors. Two connections, an "input" and "output" connection permit multiple sensors, of various types, to be connected in series. This provides the advantage of combining multiple sensor types into a single liquid detection system, in order to provide optimum liquid detection in all installations.

As noted above, the present invention 3D sensor provides a means of sensing liquid in the bulk of a material. Variations in the sensor, for example pin density and pin spacing, provide a means of adjusting the amount of liquid that must be present in the bulk material to trigger liquid detection. Further, the 3D sensor may be used to detect liquid in a bulk material for an extended period of time, whereas a surface sensor fails to continuously detect liquid, due to evaporation or the drying of the material surface.

The present invention provides a means of penetrating the surface of a first material in order to detect liquid below the surface, inside the material, on the other side of the material, or inside a second material that is behind the first material. One typical application of this 3D sensor is the detection of liquid on a concrete surface that is covered with carpet padding and carpet. For ease of installation, the 3D sensor can be mounted on the top surface of the carpet and the pins are pressed into the carpet padding beneath the carpet. Alternately, the sensor may be mounted underneath the carpet where it is not visible.

The present invention 3D sensor provides a simple means of penetrating the surface of a material, in order to sense the presence of liquid on the opposite side of the material. This is beneficial when it is difficult or impossible to remove the material.

In one aspect a flexible sensor may be clipped or strapped onto a pipe or hose, in order to detect water traveling down the length of said pipe or hose, providing liquid detection over the entire circumference of the pipe or hose. The sensor may be wrapped around the pipe or hose in a spiral manner, providing liquid detection over the surface of the pipe or hose.

The present invention provides a means of easily connecting multiple liquid detection sensors together into a sensing network or web, so that liquid detected by any of the sensors is signaled to the liquid detection controller circuitry. The present invention provides one or more connectors on each sensor so that multiple sensors may be connected in series or parallel with an interconnection consisting of commonly-available wire, which can be cut to the desired length and connected to each sensor. The sensors are connected end-to-end such that a single wire pair from the controller is extended to the first sensor, and then a second wire is connected from the first sensor to the second sensor, and so on. The connector type is such that little or no manipulation of the wires is required to connect the wire to the sensor, and tools are not required to connect the wire to the sensor.

Conventional sensors are designed to lie flat and intended to detect liquid that flows or is deposited over the surface being protected. Conventional sensor designs do not employ a means of connecting multiple sensors, of different types, in order to optimize liquid detection in every installation. The present invention achieves its advantages by providing conductive material in three dimensions, and by providing a means of connecting multiple sensors, located in remote locations, into a liquid-sensing network or web.

Figure 24:
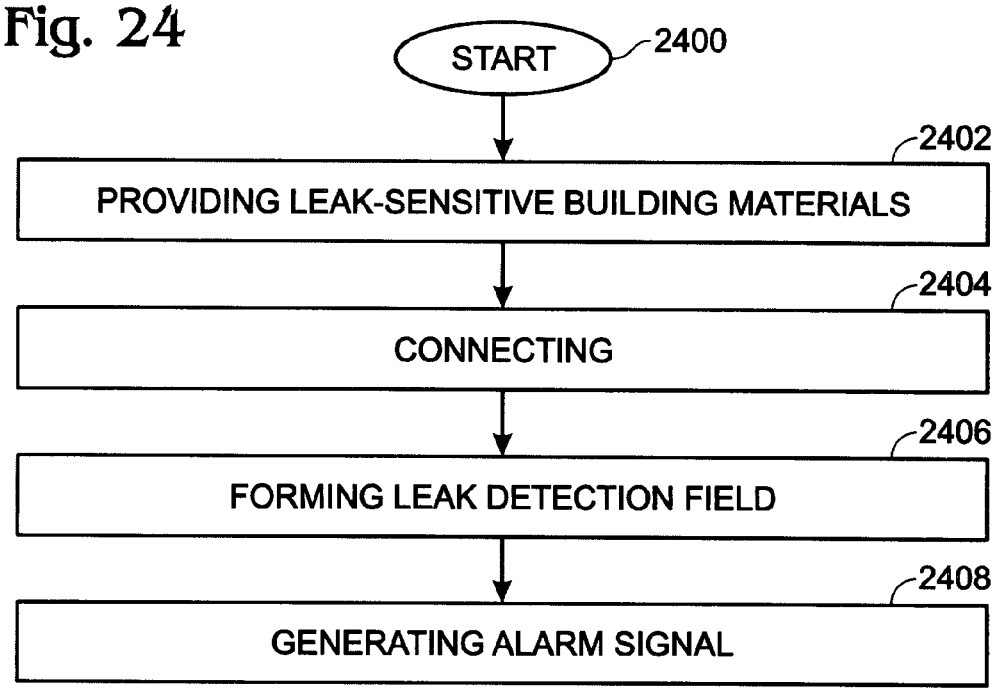
FIG. 24 is a flowchart illustrating the present invention method for forming a leak detection system from leak-sensitive building materials in a building.

FIG. 24 is a flowchart illustrating the present invention method for forming a leak detection system from leak-sensitive building materials in a building. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 2400.

Step 2402 provides leak-sensitive building materials. Step 2404 electrically connects the leak-sensitive building materials. Step 2406 forms a liquid detection field from the electrically connected leak-sensitive building materials. Step 2408, in response to detecting liquid in the liquid detection field, generates an alarm signal.

In some aspects, forming a liquid detection field (Step 2406) includes interfacing the electrically connected leak-sensitive building materials to a controller. For example, an interface selected from the group including radio frequency (RF), ac powerline, or hardwired connections may be used. Then, generating an alarm signal (Step 2408) includes generating an alarm signal in response to measuring a low electrical resistance in the liquid detection field.

In one aspect, providing leak-sensitive building materials in Step 2402 includes providing a liquid detection sensor, formed from a conductor, overlying a building material surface. For example, the liquid detection sensor may be formed from conductive ink.

In a different aspect, providing leak-sensitive building materials (Step 2402) includes: providing a building material with a surface; and, adhesively attaching a porous sheet, including a liquid detection sensor, overlying the building material surface.

Figure 25:
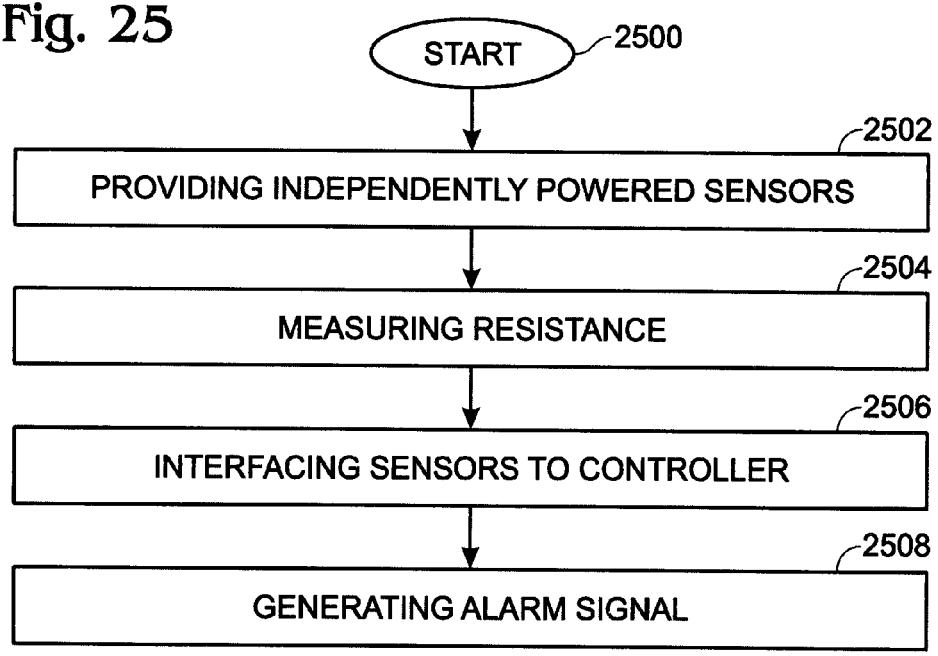
FIG. 25 is a flowchart illustrating a method for detecting water leakage in a building.

FIG. 25 is a flowchart illustrating a method for detecting water leakage in a building. The method starts at Step 2500. Step 2502 provides a plurality of independently powered liquid detection sensors. Step 2504 measures electrical resistance responsive to detected moisture. Step 2506 interfaces the sensors to a controller, using ac powerline or RF signaling for example. Step 2508 uses the controller to generate an alarm signal in response to receiving communications from the sensors.

In one aspect, interfacing the sensors to a controller (Step 2506) includes sending resistance measurements from each sensor to the controller. In a different aspect, measuring electrical resistance responsive to detected moisture (Step 2504) includes each sensor: measuring a resistance; and; comparing the measured resistance to a threshold. Then, interfacing the sensors to a controller (Step 2506) includes each sensor sending a detection message to the controller if the resistance exceeds the threshold.

Figure 26:
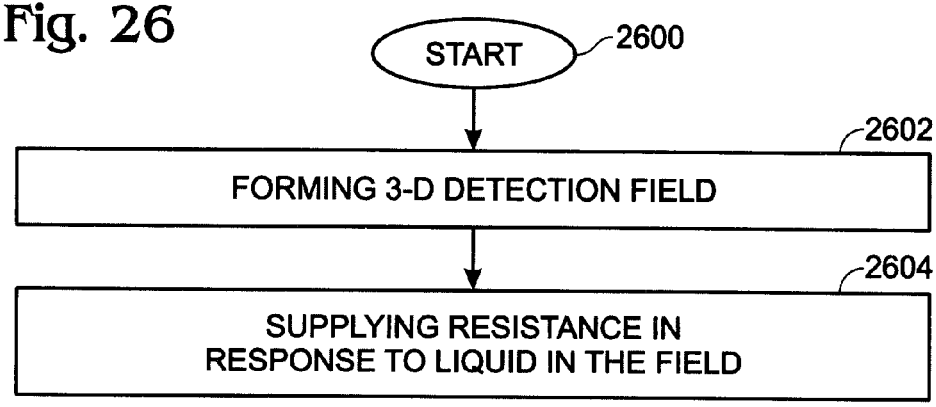
FIG. 26 is a flowchart illustrating a 3D water detection method.

FIG. 26 is a flowchart illustrating a 3D water detection method. The method starts at Step 2600. Step 2602 forms a 3D water detection field in a material. Step 2604 supplies an electrical resistance responsive to liquid in the material.

Water detection system and methods have been provided. Examples of various types of 3D and 2D sensors have been given. However, the invention is not limited to merely these examples. Examples have also been given of means of connecting these sensors and forming the connected sensors into a field. Again, examples have been given to clarify the invention, and the invention cannot be limited to just the examples. Other variations and embodiments of the present invention will occur to those skilled in the art.

We claim:

1. A three-dimensional liquid detection sensor comprising:
   a three-dimensional (3D) liquid detection field including:
      a first electrically conductive trace connected to a first electrical contact, with a first plurality of pins extending from the first trace at least partially covered by an electrical insulator; and,
      a second electrically conductive trace connected to a second electrical contact, with a second plurality of pins extending from the second trace at least partially covered by an electrical insulator; and,
   a first electrical connector to supply a resistance measurement responsive to liquid in the detection field.

2. The sensor of claim 1 wherein the first electrical connector includes a first electrical contact and a second electrical contact.

3. The sensor of claim 2 wherein the first electrical connector is shaped to electrically connect and physically engage a first mating connector with a pair of electrical contacts.

4. The sensor of claim 2 wherein the sensor includes a second electrical connector with a pair of electrical contacts.

5. The sensor of claim 1 wherein each pin has an axis aligned in a first plane.

6. The sensor of claim 1 wherein each pin has a right-angle shape.

7. The sensor of claim 1 wherein the first plurality of pins each have an axis aligned in a first plane; and,
   wherein the second plurality of pins each have an axis aligned in a second plane, different from the first plane.

8. The sensor of claim 1 wherein a plurality of pins each includes a building material attachment barb attached to a pin proximal end.

9. The sensor of claim 2 wherein the detection field additionally includes:
   a dielectric sheet;
   wherein the first electrically conductive trace is formed overlying the dielectric sheet;
   wherein the second electrically conductive trace is formed overlying the dielectric sheet.

10. The sensor of claim 1 wherein each pin has a cross-sectional axis diameter in the range of 0.01 to 0.3 inches.

11. The sensor of claim 1 wherein each pin has a length in the range of 0.25 to 5 inches.

12. The sensor of claim 1 wherein the detection field is a drywall interface and the length of each pin varies in the range of 0.375 to 0.5 inches.

13. The sensor of claim 1 wherein the detection field is an insulation interface and the length of each pin varies in the range of 1.5 to 5 inches.

14. The sensor of claim 1 wherein the detection field is a carpet interface and the length of each pin varies in the range of 0.25 to 0.375 inches.

15. The sensor of claim 1 wherein the separation between a pin from the first plurality of pins, and an adjacent pin from the second plurality of pins, is in the range of 0.1 to 2 inches.

16. The sensor of claim 9 wherein a plurality of pins are selectively detachable, at a distal end, from the electrically conductive traces.

17. The sensor of claim 1 wherein a plurality of pins each include:
   an electrically insulated shoulder covering a distal end; and,
   an electrically conductive proximal end.

18. The sensor of claim 9 wherein the dielectric sheet is rigid.

19. The sensor of claim 9 wherein the dielectric sheet is flexible.

20. The sensor of claim 9 wherein a plurality of pins each include a compressible spring connection between a distal end of the pin, and the electrical trace from which the pin extends.

21. The sensor of claim 2 wherein the first electrical connector includes spring-loaded jaws to capture a wire.

22. A three-dimensional (3D) water detection method comprising:
   forming a 3D water detection field in a material, the 3D water detection field including:
      a first electrically conductive trace connected to a first electrical contact, with a first plurality of pins extending from the first trace at least partially covered by an electrical insulator; and,
      a second electrically conductive trace connected to a second electrical contact, with a second plurality of pins extending from the second trace at least partially covered by an electrical insulator; and,
   supplying an electrical resistance responsive to liquid in the material.

23. The sensor of claim 1 further comprising:
   an alarm having an input interfacing the electrical connector.

24. A three-dimensional liquid detection sensor comprising:
   a three-dimensional (3D) liquid detection field including:
      a dielectric sheet;
      a first electrically conductive trace formed over the dielectric sheet and connected to a first electrical contact, with a first plurality of pins extending from the first trace in an axis aligned with a first plane;
      a second electrically conductive trace formed over the dielectric sheet and connected to a second electrical contact, with a second plurality of pins extending from the second trace in an axis aligned with the first plane; and,
   an electrical connector to supply a resistance measurement responsive to liquid in the detection field.

* * * * *